US007078453B1

(12) United States Patent
Feeney et al.

(10) Patent No.: US 7,078,453 B1
(45) Date of Patent: *Jul. 18, 2006

(54) BARRIER COATING OF A NON-BUTYL ELASTOMER AND A DISPERSED LAYERED FILLER IN A LIQUID CARRIER AND COATED ARTICLES

(75) Inventors: Carrie A. Feeney, Bridgewater, NJ (US); Harris A. Goldberg, Edison, NJ (US); Michele Farrell, Bethlehem, PA (US); Douglas P. Karim, Green Brok, NJ (US); Keisha R. Oree, Montclair, NJ (US)

(73) Assignee: InMat Inc., Hillsborough, NJ (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/741,251

(22) Filed: Dec. 19, 2003

Related U.S. Application Data

(60) Provisional application No. 60/498,820, filed on Aug. 29, 2003.

(51) Int. Cl.
*C08K 3/34* (2006.01)

(52) U.S. Cl. ............... 524/493; 524/447; 524/492; 524/444; 524/445; 524/446

(58) Field of Classification Search ............... 524/493, 524/447, 492, 444, 445, 446
See application file for complete search history.

(56) References Cited

U.S. PATENT DOCUMENTS

| | | | |
|---|---|---|---|
| 4,344,859 A | 8/1982 | Burke, Jr. ............... 252/359 D |
| 4,425,465 A | 1/1984 | Padget et al. ............... 524/450 |
| 4,472,538 A | 9/1984 | Kamigaito et al. ......... 523/202 |
| 4,491,618 A | 1/1985 | Kuwajima et al. .......... 428/241 |
| 4,505,755 A | 3/1985 | Shinozuka et al. ......... 106/308 |
| 4,528,235 A | 7/1985 | Sacks et al. ................. 428/220 |
| 4,536,425 A | 8/1985 | Hekal ........................... 428/35 |
| 4,857,397 A | 8/1989 | Mowdood et al. .......... 428/323 |
| 4,889,885 A | 12/1989 | Usuki et al. ................ 524/445 |
| 4,911,218 A | 3/1990 | Patitsas ....................... 152/525 |
| 4,960,639 A | 10/1990 | Oda et al. .................. 428/34.5 |
| 4,983,432 A | 1/1991 | Bissot ........................ 428/35.7 |
| 5,049,609 A | 9/1991 | Patitsas ....................... 524/386 |
| 5,091,467 A | 2/1992 | Beers ........................... 525/57 |
| 5,178,702 A | 1/1993 | Frerking, Jr. et al. ....... 152/510 |
| 5,576,372 A | 11/1996 | Kresge et al. ............... 524/442 |
| 5,576,373 A | 11/1996 | Kresge et al. ............... 524/445 |
| 5,595,750 A | 1/1997 | Jacobson et al. ............ 424/421 |
| 5,665,183 A | 9/1997 | Kresge et al. ............... 152/204 |
| 5,665,810 A | 9/1997 | Patchett et al. .............. 524/449 |
| 5,854,326 A | 12/1998 | Sakaya et al. ............... 524/445 |
| 5,883,173 A | 3/1999 | Elspass et al. ............... 524/446 |
| 5,942,298 A | 8/1999 | Sakaya et al. ............. 428/36.6 |
| 5,969,029 A * | 10/1999 | Kotani et al. ................ 524/447 |
| 6,087,016 A * | 7/2000 | Feeney et al. ............... 428/454 |
| 6,107,387 A | 8/2000 | Kaylo et al. ................. 524/446 |
| 6,162,857 A | 12/2000 | Trexle ......................... 524/445 |
| 6,232,389 B1 * | 5/2001 | Feeney et al. ............... 524/450 |
| 6,759,463 B1 | 7/2004 | Lorah et al. ................. 524/445 |
| 6,838,507 B1 | 1/2005 | Chou et al. .................. 524/445 |
| 6,942,919 B1 * | 9/2005 | Tokiyoshi et al. .......... 428/327 |
| 2002/0032272 A1 | 3/2002 | Sievers et al. ............... 524/501 |
| 2002/0058740 A1 | 5/2002 | Lorah et al. ................. 524/445 |
| 2003/0198767 A1 * | 10/2003 | Breed et al. ................ 428/36.1 |
| 2005/0059769 A1 | 3/2005 | Chou et al. .................. 524/445 |
| 2005/0197481 A1 * | 9/2005 | Temple et al. ................ 528/83 |

FOREIGN PATENT DOCUMENTS

| | | | |
|---|---|---|---|
| CA | 993738 | 7/1976 | ................ 117/237 |
| EP | 0 125 815 A2 | 11/1984 | |
| EP | 0 569 6465 A1 | 11/1993 | |
| EP | 0 604 877 A1 | 6/1994 | |
| EP | 0 747 323 A1 | 12/1996 | |
| GB | 2 134 094 A | 8/1984 | |
| JP | 11246729 | 9/1999 | |
| WO | WO 93/04118 | 3/1993 | |
| WO | 97/00910 | 1/1997 | |
| WO | WO 98/56861 | 12/1998 | |
| WO | WO 00/49072 | 8/2000 | |
| WO | WO 2004/022635 A1 | 3/2004 | |
| WO | WO 2004/065474 A1 | 8/2004 | |

OTHER PUBLICATIONS

E. L. Cussler et al., J. Membrane Sci. 38:161-174 (1988).
Chang, J. et al., Journal of Applied Polymer Science, vol. 84, 2294 (2002).
Yano, K. et al., Journal of Polymer Science A: Polymer Chemistry, 35, 2289 (1997).
Lan, T. et al., Chem. Mater. 6, 573 (1994).
Messersmith, P.B. and Giannelis, E.P, Journal of Polymer Science A: Polymer Chemistry 33,1047.
L.E. Nielsen, Journal of Macromolecular Science, Chemistry A1,929,(1967).
R.K. Bharadwaj;, "Modeling the Barrier Properties of Polymer-Layered Silicate Nanocomposites", Macromolecules 34, 9189 (2001).
G.H. Frederickson and J. Bicerano, "Barrier properties of oriented disk composites", Journal of Chemical Physics 110, 2181 (1999).

(Continued)

Primary Examiner—Margaret G. Moore
(74) Attorney, Agent, or Firm—Michael W. Ferrell

(57) ABSTRACT

Barrier coating mixtures include (a) a non-butyl elastomeric polymer; (b) an acid or base treated dispersed, substantially exfoliated silicate filler material that has not been functionalized with organic cations having an aspect ratio greater than 25; and (c) at least one additive, wherein the total solids content is less than 30% and the amount of filler is between 5% to about 60% of the total solids content. The coating retains its permeability properties under strain and has a strain to first damage of at least 5% biaxial elongation at 0% RH.

36 Claims, No Drawings

OTHER PUBLICATIONS

W. J. Ward et al., "Gas Barrier Improvement Using Vermiculite and Mica in Polymer Films", Journal of Membrane Science, 55:173-180 (1991).

Lee, D.C. and Jang, L.W., Journal of Applied Polymer Science, vol. 61, 1117-1122 (1996).

Wu, Y-P et al., "Structure of Carboxylated Acrylonitrile-Butadiene Rubber (CNBR)-Filler Nanocomposites by Co-coagulating Rubber Latex and Filler Aqueous Suspension", Journal of Applied Polymer Science, 82, 2842-2848 (2001).

Wu, Y-P et al., "Structure and Properties of Nitrile Rubber (NBR)-Filler Nanocomposites by Co-coagulating NBR Latex and Filler Aqueous Suspension", Journal of Applied Polymer Science, 89, 3855-3858 (2003).

Varghese and Karger-Kocsis, "Natural rubber-based nanocomposites by latex compounding with layered silicates", Polymer, 1-8 (2003).

Goldberg et al., "Nanocomposite Barrier Coatings for Elastomeric Applications", Materials Research Society, Symposium T: Polymer nanocomposites, paper T4.7, (Apr. 2002).

Goldberg et al., "Elastomeric Barrier Coatings for Sporting Goods", ACS Rubber Section, Apr. 29, 2002, paper 17, published in Rubber World, vol. 226, No. 5, p. 15 (Aug. 2002).

Oriakhi and Lerner ["Poly(Pyrrole) and Poly(Thiophene)/Filler Nanocomposites via Latex-Colloid Interaction", Materials Research Bulletin, 30, 723-729(1995)].

van Amerongen, G.J., "Diffusion in Elastomers", Rubber Chem Tech, 37, pp. 1065-1152 (1964).

The Vanderbilt Latex Handbook, 3rd edition, R.T. Vanderbilt Company, Inc., pp. 112-115.

Patent Abstracts of Japan, vol. 199, No. 14, Dec. 22, 1999 & JP 11 246729 A (Sumitomo Chem Co Ltd), Sept. 14, 1999.

Patent Abstracts of Japan, vol. 012, No. 467 (C-550), Dec. 7, 1988 & JP 63 189446 A (Canyo Electric Co Ltd), Aug. 5, 1988.

* cited by examiner

BARRIER COATING OF A NON-BUTYL ELASTOMER AND A DISPERSED LAYERED FILLER IN A LIQUID CARRIER AND COATED ARTICLES

CLAIM FOR PRIORITY

This non-provisional application claims the benefit of the filing date of U.S. Provisional Patent Application Ser. No. 60/498,820, filed Aug. 29, 2003.

FIELD OF INVENTION

The present invention relates to novel barrier coating compositions, and particularly to coatings, which have both an enhanced reduction in gas permeability and a relatively high degree of flexibility.

BACKGROUND OF THE INVENTION

Barrier coatings which prevent, reduce, or inhibit the permeation of a selected substrate with a gas, vapor, chemical and/or aroma have been widely described, and such coatings are used in a variety of industries, e.g., the packaging industries, automobile industries, paint industries, tire industries etc.

It is well known that the barrier properties of a polymer can be improved by the addition of impermeable plate like structures. When the plates are oriented perpendicular to the diffusion (permeation) direction, the diffusing molecules must go around the plates. This leads to significant reductions in the permeability of the polymer. See, for example, E. L. Cussler et al, *J. Membrane Sci.* 38:161–174 (1988); W. J. Ward et al, *J. Membrane Sci.*, 55:173–180 (1991); Chang, J. et al, *Journal of Applied Polymer Science*, Vol. 84, 2294 (2002); Yano, K. et al, *Journal of Polymer Science A: Polymer Chemistry*, 35, 2289 (1997); Lan, T. et al, *Chem. Mater.* 6, 573 (1994); Messersmith, P. B. and Giannelis, E. P, *Journal of Polymer Science A: Polymer Chemistry* 33, 1047 (1995); U.S. Pat. Nos. 4,528,235; 4,536,425; 4,911, 218; 4,960,639; 4,983,432; 5,091,467; and 5,049,609; and International Patent Application No. WO93/04118, published Mar. 4, 1993, among others.

Despite the numerous disclosures of barrier coatings mixtures, most of the coatings useful in the industry either do not optimally reduce permeability or tend to be brittle and non-flexible. For example, attempts to improve the gas permeability of butyl rubber as well as retain its elasticity and fatigue resistance, have involved coating butyl rubber in tires with a polymer containing a platelet filler. See, e.g., U.S. Pat. Nos. 4,911,218 and 5,049,609. Only minimal decreases in permeability were achieved by this process.

Other attempts to improve the gas barrier properties of rubber used in tires have included compositions of rubber having layered silicate platelets dispersed within the rubber composition. See, e.g. U.S. Pat. No. 4,857,397; WO97/00910 and G. J. van Amerogen, "Diffusion in Elastomers", *Rubber Chem Tech,* 37, pp 1065–1152 (1964).

Most of the earlier work uses relatively low aspect ratio platelets, at low concentrations, and thermoplastically processed at high shear rates. These conditions lead to relatively small improvements in the barrier properties of the polymer. This is because the reduction in permeability varies rapidly with the aspect ratio and the concentration of plates when the plates are well aligned [E. L. Cussler et al, *J. Membrane Sci.* 38:161–174 (1988); L. E. Nielsen, *Journal of Macromolecular Science, Chemistry A*1,929, (1967); R. K. Bharadwaj, "Modeling the Barrier Properties of Polymer-Layered Silicate Nanocomposites", *Macromolecules* 34, 9189 (2001); G. H. Fredrickson and J. Bicerano, "Barrier properties of oriented disk composites", *Journal of Chemical Physics* 110, 2181 (1999)]. If the plates are not well aligned, the reductions in permeability are further reduced. The targeted application of these earlier efforts was not coatings, but a bulk polymer with improved barrier and/or mechanical properties.

The use of platelet fillers in coating formulations is also well known. Most often, they have been used in paints to modify the rheology, enabling the production of no-drip paints. These platelet fillers are typically montmorillonites or other exfoliated silicates with aspect ratio of 50 or less. They form a house of cards type structure in the coating suspension that gives a gel like property to the paint (or coating) when it is not undergoing any shear. These structures do not have the plates aligned properly to significantly reduce the permeability of the coating.

The use of exfoliated silicates to produce nanocomposite barrier coatings has been achieved by several methods. The most widely used has been by combining a dissolved polymer with exfoliated filler. Water soluble polymers such as polyvinyl alcohol (PVOH) have been combined with water exfoliated filler such as vermiculite [Japan patent 11-246729, Sep. 14, 1999, "Gas-Barrier Poly(vinyl alcohol)/poly (acrylic acid) Compositions and their Laminates and Shaped Articles". Sumitomo Chemical Co., Ltd. Polycarbonate dissolved in toluene has been combined with organically functionalized filler to form good barrier coatings [W. J. Ward et al, "Gas Barrier Improvement Using Vermiculite and Mica in Polymer Films", *Journal of Membrane Science,* 55:173–180 (1991)]. Other polymers have also been made into improved barrier coatings by dissolving them in a solvent, and using an organically functionalized filler to improve the barrier properties [Yano, K. et at, "Synthesis and properties of polyimide-filler hybrid composites", *Journal of Polymer Science A: Polymer Chemistry,* 35, 2289 (1997)].

An alternative method that has been used to form nanocomposites has been to incorporate the exfoliated filler into the monomer before polymerization [U.S. Pat. No. 4,472, 538 "Composite Material Composed of Filler Mineral and Organic High Polymer and Method for Producing the Same", Sep. 18, 1984; U.S. Pat. No. 4,889,885 "Composite Material Containing a Layered Silicate", Dec. 26, 1989]. In some cases, this has been done in aqueous dispersion. Several monomers that can be polymerized into elastomers had exfoliated filler incorporated into the monomer droplets before the emulsion polymerization [PCT Patent No. WO 97/00910, Jan. 9, 1997, "Polymer Nanocomposite Formation by Emulsion Synthesis", Exxon Research and Engineering Co]. Methacrylate monomer was combined with exfoliated filler in aqueous dispersion prior to its polymerization into a nanocomposite [Lee, D. C. and Jang, L. W., *Journal of Applied Polymer Science, Vol.* 61, 1117–1122 (1996)]. None of these methods led to practical coating formulations. They were designed to help make bulk nanocomposites for thermal processing.

Several references have been made to the orientation of platelet materials in rubber and polymeric compositions. Specific perpendicular orientation of the platelets to the direction of gas diffusion has been found to decrease gas permeability of rubber compositions containing layered silicate platelets, while not adversely affecting the flexibility of the rubber. See, e.g. U.S. Pat. Nos. 5,576,372; 5,576,373; and 5,665,183. Puncture resistance is increased in polymeric sheet material comprising discrete platelets which are oriented substantially parallel to the plane of the sheet material in an overlapping interrelation. See, e.g., U.S. Pat. No. 5,665,810.

Most of the coatings useful in the industry which contain platelet type fillers are prepared by melt processing, in which solid polymer and solid filler are melted together and mixed at high shear rates. Such melt-processed coatings have 100% solids, and usually use less than about 3% by weight of the platelet fillers. Such coatings do not optimally reduce permeability.

Tires with integral innerliners are disclosed in U.S. Pat. No. 5,178,702, wherein the tire has a top layer and multiple layers of rubber laminate in which at least two layers are barrier layers comprising a sulfur cured rubber composition having 100 parts by weight rubber, 100 parts by weight acrylonitrile/diene polymer and about 25–150 parts by weight of platy filler of unspecified width and thickness. These compositions are stated to reduce the costs of the innerliners while maintaining flexibility and barrier performance.

There are several examples of using an aqueous dispersion of exfoliated filler with an aqueous dispersion of polymer to form a nanocomposite. Most of that work used elastomeric polymers in suspension [Wu, Y-P et al, "Structure of Carboxylated Acrylonitrile-Butadiene Rubber (CNBR)-Filler Nanocomposites by Co-coagulating Rubber Latex and Filler Aqueous Suspension", *Journal of Applied Polymer Science*, 82, 2842–2848 (2001); Wu, Y-P et al, "Structure and Properties of Nitrile Rubber (NBR)-Filler Nanocomposites by Co-coagulating NBR Latex and Filler Aqueous Suspension", *Journal of Applied Polymer Science*, 89, 3855–3858 (2003): Varghese and Karger-Kocsis, "Natural rubber-based nanocomposites by latex compounding with layered silicates", *Polymer* (in press) (2003); Feeney et al, U.S. Pat. No. 6,087,016, "Barrier Coating of an Elastomer and a Dispersed Layered Filler in a Liquid Carrier", Jul. 11, 2000; Feeney et al, U.S. Pat. No. 6,232,389, "Barrier Coating of an Elastomer and a Dispersed Layered Filler in a Liquid Carrier and Coated Articles", May 15, 2001; Goldberg et al, "Nanocomposite Barrier Coatings for Elastomeric Applications", *Materials Research Society, Symposium T*: Polymer nanocomposites, paper T4.7, (April 2002); Goldberg et al, "Elastomeric Barrier Coatings for Sporting Goods", ACS Rubber Section, Apr. 29, 2002, paper 17, published in *Rubber World, vol.* 226, No. 5, p 15 (August 2002)]. The typical use of ion exchange to make the filler surface more compatible with the polymer is not used in these references, in that usually makes the filler fall out of aqueous suspension. In order to form a nanocomposite from a combination of polymer spheres and filler platelets, one needs significant flow and deformation of the polymer.

None of the above art discusses treatments of the filler that enhance the flexibility of the final nanocomposite.

There remains a need for low permeability coatings with improved flexibility in a variety of applications. These applications include chemical protective gloves, face masks and protective suits. Other uses include low permeability coatings for sports balls, rubber hoses, inflatable boats and other inflatable products, bladders used in production and to protect storage tanks, window sealing, inner tubes for bicycles, and tires. Pneumatic products need improved air barrier. Rubber hoses for fuel lines, protective equipment (such as gloves) and other products need improved resistance to petroleum oils and gasoline. Rubber is often used as protection against corrosion (storage tanks) and hazardous chemicals (gloves, chemical protective suits, face masks and hoods).

SUMMARY OF THE INVENTION

Advantageously, the present invention solves the problems of the prior art by providing a coating composition, which contains substantially dispersed exfoliated layered silicate filler which has been acid or base treated and a water dispersed non-butyl elastomeric polymer. This coating, when dried, results in a barrier with large reductions in permeability relative to the unfilled polymer.

In one aspect this invention provides a barrier coating from an aqueous dispersion of a non-butyl elastomeric polymer, a substantially exfoliated silicate filler material not functionalized with organic cations, the silicate having an aspect ratio greater than 25, wherein % of the silicate is less than 60% of the total solid content, and at least one additive, selected from the group consisting of surfactants, emulsifiers, anti-foaming agents, dispersing agents, wetting agents, leveling agents and thickeners wherein the coating exhibits an at least a 5-fold greater reduction in gas permeability than a coating formed of the non-butyl elastomeric polymer alone. The coating retains its barrier properties under strain and has a strain to first damage of at least 5% biaxial elongation at 0% RH.

The barrier coating can further retain its barrier properties under strains to first damage of at least 10%, 25% and 40% biaxial elongation at 0% RH.

The barrier coating can further exhibit at least 25-fold, 50-fold, 100-fold and 200-fold reductions in gas permeability as compared with a coating formed of the non-butyl elastomeric polymer alone.

The barrier coating according can be a dispersion, an emulsion, a suspension and a latex.

The preferred non-butyl elastomeric polymer is selected from Neoprene, nitrile rubbers, and EPDM. These polymers can be cured, un-cured and partially cured.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates. The preferred silicate filler is vermiculite, which can be present in the dispersion at less than 60% of the total solids, preferably at between 5 to about 50% of the total solids. The barrier coating has total solids content of from about 1 to about 30%, preferably from about 5 to about 25%.

The silicate filler can be treated with acid or base prior to mixing with the non-butyl elastomeric polymer. The acid is chosen from acetic acid, glycine and citric acid and the base is chosen from ammonium hydroxide, sodium hydroxide and potassium hydroxide.

In a further aspect, the invention provides for a method of producing a barrier coating film comprising applying to a substrate an aqueous dispersion containing a non-butyl elastomeric polymer, a substantially exfoliated silicate filler material not functionalized with organic cations, the silicate having an aspect ratio greater than 25, wherein % of the silicate is between 5 and 60% of the solid content, and at least one additive, selected from the group consisting of surfactants, emulsifiers, anti-foaming agents, dispersing agents, wetting agents, leveling agents and thickeners and drying the dispersion to a barrier coating having the same polymer to filler ratio as in the dispersion wherein the coating exhibits an at least 5-fold greater reduction in gas permeability than a coating formed of the non-butyl elastomeric polymer alone and the coating retains its barrier properties under strain and has a strain to first damage of at least 5% biaxial elongation at 0% RH.

The barrier coating can further retain its barrier properties under strains to first damage of at least 10%, 25% and 40% biaxial elongation at 0% RH.

The barrier coating can further exhibit at least 25-fold, 50-fold, 100-fold and 200-fold reductions in gas permeability as compared with a coating formed of the non-butyl elastomeric polymer alone.

The barrier coating can be a dispersion, an emulsion, a suspension and a latex.

The preferred non-butyl elastomeric polymer is selected from Neoprene, nitrile rubbers, and EPDM. These polymers can be cured, un-cured and partially cured.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates. The preferred silicate filler is vermiculite, which can be present in the dispersion at less than 60% of the total solids, preferably at between 5 to about 50% of the total solids. The barrier coating has total solids content of from about less than 30%, preferably from about 5 to about 25%.

The silicate filler can be treated with acid or base prior to mixing with the non-butyl elastomeric polymer. The acid is chosen from acetic acid, glycine and citric acid and the base is chosen from ammonium hydroxide, sodium hydroxide and potassium hydroxide.

The substrate is selected from the group consisting of films, membranes, gloves, tennis balls, basketballs, soccer balls, footballs, volley balls, racket balls, handballs, beach balls and toy balls and inflated products such as automobile and truck tires, bicycle tires, boats, air mattresses and inflatable beds.

The present invention, in part, is based on the discovery that by providing a coating composition, which contains a substantially dispersed exfoliated layered silicate filler, which has been acid or base treated, in a non-butyl elastomeric polymer, a low permeability coating can be obtained with improved flexibility for a variety of applications. This coating, when dried, results in an elastomeric barrier with gas permeability reduced by a factor greater than 5-fold, when compared to a film formed of the dried, unfilled non-butyl elastomeric polymer alone, maintains its reduced permeability under strain and has a strain to first damage of at least 5% biaxial elongation at 0% RH. This invention is distinguished over Feeney et al. in that it describes formulations and coatings, which have significantly improved flexibility (relative to the earlier described nanocomposite coatings) while maintaining a large reduction in permeability relative to the unfilled polymer.

Other aspects and advantages of the present invention are described in the detailed description below and in the claims.

DETAILED DESCRIPTION OF THE INVENTION

The present invention fills the unmet need in the art of barrier coatings by providing barrier coating mixtures suitable for application to flexible or elastomeric substrates, including flexible or elastomeric substrates under pressure. These coatings of the invention reduce the gas permeability of these substrates. The coated articles, as well as freestanding films and membranes produced by these barrier coating mixtures are also provided by the invention.

An embodiment of this invention provides a barrier coating derived from an aqueous dispersion of a non-butyl elastomeric polymer, a substantially exfoliated silicate filler material not functionalized with organic cations, the silicate having an aspect ratio greater than 25, wherein % of the silicate is less than 60% of the total solid content, and at least one additive, selected from the group consisting of surfactants, emulsifiers, anti-foaming agents, dispersing agents, wetting agents, leveling agents and thickeners wherein the coating exhibits an at least 5-fold reduction in gas permeability than a coating formed of the unfilled non-butyl elastomeric polymer alone and the coating retains its barrier properties under strain, and has a strain to first damage of at least 5% biaxial elongation at 0% RH. The barrier coating can be in the form of a dispersion, an emulsion, a suspension and a latex.

The preferred non-butyl elastomeric polymers are Neoprene, nitrile rubbers and EPDM.

The preferred silicate filler is vermiculite, which can be treated with either acid or base prior to mixing with the polymer mixture. The preferred acids are selected from acetic acid, glycine and citric acid and the preferred bases are selected from ammonium hydroxide, sodium hydroxide and potassium hydroxide.

The preferred barrier coating has total solids content of from about 5% to about 25% and the dispersed silicate filler is present at between 10 to about 50% by weight of the total solids content.

In a further embodiment, the invention provides a method of producing a barrier coating film that comprises applying to a substrate an aqueous dispersion containing a non-butyl elastomeric polymer, a substantially exfoliated silicate filler material not functionalized with organic cations, the silicate having an aspect ratio greater than 25, wherein % of the silicate is between 5 and 60% of the solid content, and at least one additive, selected from the group consisting of surfactants, emulsifiers, anti-foaming agents, dispersing agents, wetting agents, leveling agents and thickeners, and drying the dispersion to a barrier coating having the same polymer to filler ratio as in said dispersion wherein the coating exhibits an at least 5-fold reduction in gas permeability than a coating formed of the unfilled non-butyl elastomeric polymer alone, the coating retains its barrier properties under strain and has a strain to first damage of at least 5% biaxial elongation at 0% RH. The barrier coating can be in the form of a dispersion, an emulsion, a suspension and a latex.

The preferred non-butyl elastomeric polymers are Neoprene, nitrile rubbers and EPDM.

The preferred silicate filler is vermiculite, which can be treated with either acid or base prior to mixing with the polymer mixture. The preferred acids are selected from acetic acid, glycine and citric acid and the preferred bases are selected from ammonium hydroxide, sodium hydroxide and potassium hydroxide.

The preferred barrier coating has total solids content of from about 5% to about 25% and the dispersed silicate filler is present at between 10 to about 50% by weight of the total solids content.

The substrates are selected from the group consisting of films, membranes, gloves, tennis balls, basketballs, soccer balls, footballs, volley balls, racket balls, handballs, beach balls and toy balls and inflated products such as automobile and truck tires, bicycle tires, boats, air mattresses and inflatable beds.

I. Definitions

The term "aspect ratio" is defined as a characteristic of every platelet material in solid form. Aspect ratio is the product of the lateral dimension of a platelet filler particle, e.g., mica flake, divided by the thickness of the platelet. "High aspect ratio" refers to a platelet filler whose lateral dimension divided by thickness is greater than 25. The aspect ratio of any filler is an inherent property of the selected filler. For example, MICROLITE® 963 aqueous vermiculite solution [W. R. Grace, See EP Application No. 601,877, published Jun. 15, 1994] has a characteristic aspect ratio of about 10,000 or dimensions of 10–30 μm×10 Å.

A "barrier coating mixture" includes a liquid containing suspended solids, which is used to apply the solids to a substrate. A novel aspect of the present invention is that the barrier coating mixtures provide a better dispersion of platelet fillers in liquid at an unusually low solids content, e.g., between about 1 to about 30% solids as described in more detail below. According to this invention, once the "coating mixture" is dried, it is referred to as a "dried coating" or a "film".

The term "damage" means any visually observable change in the surface of the barrier coating, such as cracks, crazes or other changes in texture.

"Exfoliation" is defined for layered fillers as the complete separation of individual layers of the original particle, so that polymer completely surrounds each particle. Desirably polymer is present between each platelet, that the platelets are randomly spaced. No X-ray line appears because of the random spacing of exfoliated platelets. In some circumstances, the filler can exfoliate when dispersed in an aqueous or non-aqueous medium. This would result in a higher aspect ratio than that of a solid particle before dispersion.

The term "gas barrier" includes a barrier to oxygen, nitrogen, carbon dioxide and other gases.

"Mesoscopic domains" means that the plates form locally oriented domains where the platelets are well aligned. Macroscopic domains can be seen when suspensions of particles forming Mesoscopic domains are viewed through cross polarizers. These domains become difficult to see when polymer is dispersed in the water.

As used herein, the term "mixture" or "coating mixture" is interpreted to include colloidal dispersions, suspensions, emulsions and latexes, as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid.

The term "nanocomposite" or "filled polymer nanocomposite" refers to the mixture of substantially exfoliated filler and polymer. The degree of exfoliation of the filler in the polymer is not specified. The thickness of at least some filler particles is below 1 micron, and probably well below 100 nm.

The term "Non-Butyl elastomer" is defined as a polymeric material that does not consist essentially of moieties derived from isobutylene, as does butyl rubber. Preferably, the Non-Butyl elastomer employed has less than 50 mole percent of moieties derived from isobutylene.

The term "substrate" or "article" coated by these coatings include, without limitation, flexible and elastomeric (or highly elastic) materials, such as rubber, and other surfaces, such as tires, balloons, gloves, prophylactics, diaphragms and membranes for accumulation, actuators and regulators, and the like.

II. The Barrier Coating

A barrier coating according to this invention includes the following components:
(a) a water dispersed non-butyl elastomeric polymer;
(b) a dispersed, exfoliated layered platelet silicate filler, which has been acid or base treated, having an aspect ratio greater than 25; and
(c) at least one additive, selected from the group consisting of surfactants, emulsifiers, anti-foaming agents, dispersing agents, leveling agents and thickeners,
wherein the total solids content is desirably below 30% solids and the amount of treated filler represents 5-60% of the total solids content. These barrier-coating mixtures result in films with reductions in permeability of 5 times to 100 times or even higher relative to the unfilled polymer that maintains its reduced permeability under strain and has a strain to first damage of at least 5% biaxial elongation at 0% RH. These results are substantially higher than the prior art on other platelet filled barrier coatings.

The barrier coating mixtures of this invention are characterized by a balancing of several critical features, i.e., appropriate dispersion of the filler in the non-butyl elastomeric polymer, orientation of the filler platelets in the non-butyl elastomeric polymer, as well as high aspect ratio of the filler, in order to achieve the desired permeability reductions and flexibility in the dried barrier coating. The barrier coating mixture of this invention desirably contains unusually low solids content, i.e., between about 1% and about 30% solids. A more desirable range of solids content is between about 5% to about 25% solids. The solids content is an important consideration in the barrier coatings compositions and performance of the dried coatings because the solids content effects the dispersion of the high aspect ratio filler. If high total solids content is used in the barrier coating composition, one would not achieve well-dispersed filler, e.g., vermiculite, and the permeability reductions characteristic of the coatings of this invention, and reported in the examples and figures herein, are not achieved. The preferred range of solid content (5–25%) is unexpectedly well below that typically used in the coating industry and therefore not predicted by the prior art teachings concerning barrier coatings formulations.

The total solids content of the coating mixtures of this invention is less than 30% with the treated filler representing 5–60% of the total solids content. Preferred non-butyl-containing polymers include Neoprene, nitrile and ethylene propylene diene (EPDM) rubber and the filler is a vermiculite suspension. Examples 3–4, 6–12 and 15–21 indicate a variety of desirable compositions of this invention characterized by polymer and filler concentrations within the above range.

Preferably, in the dried barrier coating (film), the polymer is present at between about 50 to about 90 by weight and the dispersed layered filler is present at between about 10 to about 50% by weight.

A. The Non-Butyl Elastomeric Polymer

Non-Butyl elastomeric polymers useful in forming coating mixtures of this invention include polymers selected generally from among many classes. The selected polymers may be curable polymers, partially cured polymers, or uncured polymers, and are dispersible in water. Such polymers include, without limitation, olefinic thermoplastic elastomer (TPO); polyamide thermoplastic elastomer (Polyamide TPE); polybutadiene thermoplastic elastomer, e.g., syndiotactic 1,2-polybutadiene thermoplastic elastomer (polybutadiene TPE); polyester thermoplastic elastomer (Polyester TPE); polyurethane thermoplastic elastomer (TUPR), for example, thermoplastic polyester-polyurethane elastomer (TPAU), and thermoplastic polyether-polyurethane elastomer (TPEU); styrenic thermoplastic elastomer (Styrenic TPE); vinyl thermoplastic elastomer, e.g., polyvinyl chloride polyol (pPVC).

A variety of rubbery polymers may also be employed as the polymer component of the present invention, including acrylic rubber, such as ethylene-acrylate copolymer (EACM); and butadiene rubber, such as polybutadiene.

Still other useful non-butyl elastomeric polymers are chlorosulfonated polyethylene rubber, e.g., chlorosulfonated polyethylene (CSM); epichlorohydrin rubber, such as polyepichlorohydrin (CO), polyepichlorohydrin copolymer (CO copolymer); ethylene-propylene rubber (EPR), such as ethylene-propylene copolymer (EPM), ethylene-propylene-diene copolymer (EPDM).

Other polymers for such use include fluoroelastomers, for example, vinylidene fluoride-hexafluoropropylene copolymer (FKM); natural rubber (NR); neoprene rubber such as polychloroprene (CR); nitrile rubber, for example, acrylonitrile-butadiene copolymer (NBR); polysulfide rubber; polyurethane, for example, polyester urethane (AU), and polyether urethane (EU); propylene oxide rubber; silicone rubber, for example, silicone (MQ), and methylvinyl-fluorosilicone (FVMQ) and styrene-butadiene rubber, for example, styrene-butadiene copolymer (SBR).

Particularly preferred polymers include Neoprene rubber, nitrile rubber and EPDM rubber.

The polymer is preferably capable of forming a dispersion, latex, suspension or emulsion in water or a mixture of water and some solvent.

B. The Filler

The coating mixtures of this invention as described above also include an acid or base treated dispersed exfoliated layered filler which, upon mixture, has an inherently high aspect ratio, which can range from about 25 to as high as about 30,000. The presently preferred filler is vermiculite. More particularly, a desirable vermiculite is MICROLIT® 963 water-based vermiculite dispersion (W. R. Grace) [See, EP Application No. 601,877, published Jun. 15, 1994] which is a 7.5% by weight aqueous solution of dispersed mica. In the coating mixtures (the liquid), the layered filler is present at between about 5 to about 60% by weight of the total solids. In the dried coatings of this invention, the layered filler is present at a minimum of about 5% by weight to a maximum of about 60% of the dried coating. The compositions of the present invention, when dried, retain the filler in well-dispersed form, resulting in a high aspect ratio of the dried filler in the coating, and greatly increased reduction in permeability.

Examples of filler include exfoliated silicates, for example, bentonite, vermiculite, montmorillonite, nontronite, beidellite, volkonskoite, hectorite, saponite, laponite, sauconite, magadiite, kenyaite, ledikite and mixtures thereof. MICROLITE® vermiculite is the preferred filler because of its very high aspect ratio. The vermiculite plates have an average lateral size of between 10 and 30 microns. The plates are largely exfoliated in water, and thus their thickness is 1–2 nm. The aspect ratio of the filler in water dispersion is an average of 10,000–30,000. It is clear that many plates reassemble during the coating and drying process of the present invention. It is a great advantage to start with as large an aspect ratio as possible. The selection and use of other known silicates which have properties similar to those of MICROLITE® vermiculite, as well as sufficiently high aspect ratios, are expected to be obvious to one of skill in the art following the teachings of this invention.

Large aspect ratio platelets in the filler can be locally oriented. The mesoscopic nature of the suspended plates is a direct consequence of the aspect ratio. A simple demonstration of the large aspect ratio of MICROLITE® 963 is the fact that oriented macroscopic domains can be observed when it is dispersed in water at a concentration of 0.02% by weight, or 0.01% by volume. The concentration above which a platelet filler will be locally oriented in suspension is given approximately by 1/aspect ratio. Thus fillers that start with an aspect ratio of 25 would have to be deployed above 4% by volume in a dispersion to achieve high local orientation.

Although MICROLITE® 963 vermiculite (W. R. Grace) is preferred, good results may also be achieved with other exfoliated grades of MICROLITE® vermiculite (i.e., grades 963++, 923, and 903). Other layered silicates are also useful in the barrier coatings and films of this invention. In particular are SOMASIF™ ME-100 from CO-OP Chemical co. Ltd. (Tokyo, Japan) and SCPX-2041 from Southern Filler Products (Gonzales, Tex.). The effectiveness of other silicates in the barrier coating of this invention depends upon the lateral size of the platelets, the degree of exfoliation in water, and the degree to which they reassemble to form larger particles during the coating and drying process.

A barrier coating will include a pre-treatment of the exfoliated silicate filler with acid or base. While there is not yet a full understanding of the mechanism that takes place between the acid or base and the filler particles, the key reasons to use such a treatment include:

1. Improved compatibility of the aqueous polymer dispersion and the aqueous dispersed filler. This is still quite different from other work aimed at improving the compatibility of the polymer and the filler. Organic groups are not being put on the flat surface to the filler in any significant amount (because those groups are negatively charged and wouldn't stick to that surface).
2. Improved stability of the coating formulation.

In both cases, the acid or base treatment modifies the detailed interaction among filler particles, and between the filler and the polymer dispersed in the water. It may also modify the interaction with surfactants and thickeners. Although these interactions are not fully understood, the improvements observed probably arise from one or both of the following mechanisms:

1. Chemical modification of the filler—i.e. the attachment of acid or base groups to the edges or at defects in the filler structure. In addition, the treatment may remove metal ions from the filler, further changing its interaction with charged surfactants and other components in the formulation.
2. Physical changes in the plate structure: If the acid or base treatment locally modifies the filler at defects and or impurities, it may cause the plates to bend. If the plates are not flat, they will have regions where they are in contact. On the other hand, they cannot fully agglomerate into larger filler particles when they are not flat. These types of physical changes are consistent with observation of changes in viscosity and stability when the filler is treated. Physical changes such as those described are also consistent with the fact that the changes are not reversible when an acid treated filler is subsequently treated with a base. If physical changes are critical to improved properties, such changes may be achieved by methods other than acid or base treatment.

C. Surfactants and Other Additives

Coating mixtures of this invention also contain at least one or more than one suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant. Preferably, the surfactant(s) useful in the methods and dispersions of this invention are nonionic, particularly useful with a highly charged filler, such as vermiculite. In the event of an unfavorable interaction of the anionic emulsifier present in the latex dispersion, any additional ionic additives must be kept to a minimum. This variable is eliminated where the surfactant or emulsifier is non-ionic. Increase in ionic concentration of the compositions containing vermiculite, such as by the addition of a base to adjust pH, e.g., KOH, $NH_4OH$ and NaOH can cause agglomeration of the filler, which adversely affects permeability reduction.

Cationic surfactants that can ion exchange with the alkali metal counterions present in the layered silicates have not been used. They will typically make the filler surface hydrophobic, and thus make a stable water suspension impossible. Limited quantities of cationic surfactants may be included as long as they don't adversely affect the coating formulation stability.

Some embodiments of this invention include at least two surfactants, which include preferably both a wetting agent and an anti-foaming agent. Still other compositions may have additional surfactants to perform additional effects. Desirable surfactants employed in the examples below are the non-ionic siloxane-based, SILWET® L-77 wetting agent [OSI Specialties, Inc.], ZONYL FSP and 8952 (DuPont Performance Chemicals and Intermediates) and FOAMASTER® VL defoamer (Henkel).

Other suitable surfactants may also be selected. The amount and number of surfactants added to the coating composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 15% by weight of the dried coating.

Alternatively, the same surfactant molecule can be chemically bonded to the polymer as 1) a copolymer moiety or 2) an added reactive moiety that can later react with the polymer.

Other optional components of the coating mixture include conventional agents to adjust pH, such as bases, e.g. $NH_4OH$, NaOH or KOH or acids, e.g. acetic acid, citric acid or glycine provided that care is taken to avoid agglomeration, as discussed above.

In another embodiment, thickeners may be used in the coating formulations to adjust viscosity. One of skill in the art would readily determine and adjust the type and amounts of thickener depending on the type and amount of filler employed in the coating mixture based on the teachings contained herein.

When a film or coating limits the diffusion of any molecule or chemical, it is well known that the penetration of the said molecule can be further reduced by the addition of absorbers or getters to either the coating, or in a layer or material below the coating. This concept is used commercially in Honeywell's AEGIS™ Nylon films to block the diffusion of oxygen. It is clear that the same concept can be used in conjunction with nanocomposite coatings to block the penetration of oxygen, water, chemical warfare agents, or any other material. The use of such absorbers will not have a large effect on the steady state permeability, but it will primarily affect the time it takes for the first molecules to diffuse through the system. This breakthrough time is most important in packaging, chemical protective, and electronic applications.

In several applications, it will be advantageous to put the barrier coating on the inside of the product. This is already done in tennis balls. Tire innerliners provide the barrier that helps air retention, and it is the last layer on the inside to the tire.

In order to put a coating on the inside of rubber products such as bladders and/or tubes, one method that can be used is to turn the product inside out before coating. The coating can then be applied to the outside via a standard process such as dip or spray coating. The coating can then be dried (and this is facilitated by the fact that it is on the outside). After drying, the product can again be turned inside out, so that the coating ends up as the inside layer. This elastomeric nature of both the product and the coating are essential for this process to be effective and not to cause extensive damage. Two examples of products where this type of processing may be important are sport ball bladders (such as soccer balls) and bicycle and other tire tubes.

D. The Carrier Liquid

The coating mixtures of this invention are present in a suitable carrier liquid that is predominantly water. Combinations of water with an organic carrier may also be used as the carrier liquid. Examples of suitable organic carriers could include hexane, heptane, toluene, isopropyl alcohol, cyclohexanone, ethanol, methanol, other hydrocarbons, and combinations thereof. Selection of a suitable organic solvent carrier is within the skill of the art.

E. Embodiments of Barrier Mixtures

One example of a barrier coating mixture useful for application to a tire or tire surface or interface according to this invention comprises a coating formed by a barrier coating mixture comprising in a carrier liquid: (a) a non-butyl elastomeric polymer; (b) an exfoliated layered platelet filler treated with an acid or a base having an aspect ratio greater than 25; and (c) at least one additive, wherein the total solids content of said mixture is less than 30% and the filler is present in amounts of 5–60% of the total solids. These barrier coating mixtures result in films with reductions in permeability of 5× to 100× or even higher relative to the unfilled polymer that maintains its reduced permeability under strain and has a strain to first damage of at least 5% biaxial elongation at 0% RH. These results are substantially higher than the prior art on other platelet filled barrier coatings.

In a preferred embodiment, the coating mixtures described above have total solids contents equal to or less than 30%, with the filler comprising from 5-60% of the total solids and between about 0.1% to about 15% by weight of additive(s). The dried coatings of the mixtures described above, contain fillers which reduces the gas permeability greater than 5-fold that of the dried, unfilled polymer alone that maintains its reduced permeability under strain and has a strain to first damage of at least 5% biaxial elongation at 0% RH.

One preferred coating mixture useful in this invention has a solids content of between about 5 to about 25% by weight and the dried coating comprises between about 50% to about 90% by weight of a non-butyl elastomer polymer latex, between about 10% to about 50% by weight of an acid or base treated vermiculite filler, with the total additive weight percent up to about 15%. Additional preferred barrier coating mixtures useful in this invention may be prepared by methods described in detail in Examples 3–4, 6–12 and 15–21.

III. The Coated Article

Once prepared as described, the coating mixtures may be applied to a suitable substrate to reduce the permeation rate of the substrate to gas. In the dried coating, more preferably, the polymer is present in the mixture when dried at a weight percent of at least about 40%. The acid or base treated filler is preferably present in said mixture when dried at greater than about 5% by weight. The dried coating reduces the gas permeability greater than 5-fold that of the dried, unfilled polymer alone. Reductions in permeability attributed to compositions of this invention can range from approximately 5× to about 100× or greater that of unfilled polymer alone.

Desirable substrates for coating with the coating mixtures of this invention may be flexible and/or elastomeric substrates, optionally under pressure. Examples of flexible or elastomeric substrates include balloons, gloves, dirigibles, tires for bicycles, automobiles and trucks, etc., and tire layers, prophylactics, pressure accumulators, regulators and actuators, diaphragms and membranes.

Another desirable application of this invention is as a liner or coating for a pneumatic device or any device under pressure, such as sport and toy balls, such as tennis balls, basketballs, soccer balls, footballs, volley balls, racket balls, handballs, beach balls and the like. Essentially, any elastomeric containing object that either holds air or another gas under pressure, or requires the exclusion of air, or other gases can be coated with the compositions of this invention, e.g., inflated products such as boats, air mattresses, and inflatable beds, etc. Still another sports application for this coating is as an undercoating for golf balls, for moisture resistance.

Many of the sport balls use a bladder to hold the air or other gas inside the balls. The bladders are currently made from natural rubber, butyl rubber and polyurethane. The coating compositions of this invention are particularly useful when coated on these bladders to improve their ability to hold air. The coatings are applied as described herein, e.g., by dip coating, as is often used to produce the bladder itself, or spray coating. The coatings are applied either during the bladder manufacture or after the bladder has been fabricated. The coatings of the present invention are applied to the inside or outside of the bladder, depending on the manufacturing process for the bladder. In addition, some bladders are manufactured in multiple layers, and a coating composition of this invention is used on one or more of the layers, thus forming a laminated structure with the bladder material.

One advantage of using the coating compositions of this invention is that these coatings add barrier performance to a relatively thick bladder with a thin coating that would not have a major effect on the weight or mechanical properties of the final product.

In the cases of products that do not use a bladder such as tennis balls, the coating compositions of this invention are preferably applied on the inside of the ball. In this way, the coating does not affect the adhesion of the outside felt to the rubber. The coating is applied by standard techniques as already discussed, with spray coating likely to be the most effective. With regard to enhancing the moisture resistance of golf balls, the barrier coating of this invention is desirably applied inside the outer layer of the golf ball. The barrier coatings of this invention are also desirably applied on the inside (or an inside layer) of toy balls, inflatable boats, or air mattresses.

These coatings can also be used as a key component in chemical protective gloves, face masks and protective suits. All of these products often use butyl rubber or other elastomers as a diffusion barrier in order to protect the wearer from solvents and other hazardous chemicals. The nanocomposite coatings described here can be used as one or more layers in such protective equipment thereby improving the degree of protection offered. The nanocomposite coating can be on the inside, outside and/or an internal layer of a multilayer product.

IV. Methods of Coating a Substrate or Forming a Film

The articles to be coated by the compositions of the invention may be previously untreated or may have a variety of pre-treatments to their surfaces, depending upon the identity and utility of the article. For example, the article may have on at least one side a heat seal layer. Such heat seal layers may be made of an ethylene-propylene copolymer or ethylene-propylene-butylene terpolymer. Thus, the coating solution is applied on the surface of the heat seal layer. Alternatively, the substrate or article may comprise a protective topcoat layer, such as polyurethane or TEFLON®-type materials [DuPont] for abrasion resistance, etc. Such topcoats may be selected by one of skill in the art. The coatings of this invention may be applied over or under the topcoat layer.

Alternatively, the coating mixtures of the invention may be applied to a releasable mold in order to form a film, rather than a coated article. The film thus consists of a dried mixture of the above-described polymer and greater than 2% by volume (5% by weight) of the layered filler having an aspect ratio greater than 25. The film, which may be in the form of a membrane, may itself be employed as a gas barrier layer for use in various laboratory procedures, or as a glove or balloon material. Such a dried, free-standing film or membrane, is characterized by a reduction in gas permeability greater than 5-fold the permeability of a film formed of the dried polymer alone.

To form the coated article or free-standing film of this invention, the coating mixtures of this invention may be applied to the selected surface or article by techniques including, without limitation, roll coating, spray coating, brush coating and dip coating techniques. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a substrate or a mold at any desired thickness, depending on the substrate, the purpose for which the coating is being applied and the ultimate use of the coated article. Thus, for example, the coating mixtures of the present invention may be applied to an article or substrate by the methods described above to form a dried coating of a thickness between about 0.1 μm to about 200 μm of dry coating. Such adjustments are well within the skill of the art [See, e.g., Canadian Patent No. 993,738].

After coating, the coated article or mold may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. After drying, the exfoliated silicate filler particles are oriented within the elastomeric latex (solution, emulsion, etc.) to a high degree parallel to each other and to the substrate surface. One of skill in the art can readily adjust the drying conditions as desired.

The dried coatings exhibit a surprising reduction in permeability compared to the prior art and particularly compared to unfilled polymers. As evidenced in the Examples below, reductions in permeability caused by the dried coatings of this invention are shown to be from about 5 fold to about 100 fold relative to the unfilled polymers alone. The evaluations of permeability of the coatings of the present invention are determined using the following parameters. The oxygen transmission rate (OTR) of the dried coating on the article, or the free-standing film, is generally measured using conventional apparatus, such as a Mocon OX-TRAN 2/20 module. OTR units are cc/m² day at 1 atmosphere, 0% relative humidity at 23° C. The permeability of the coating is calculated by multiplying the OTR and coating thickness. Permeability units are cc mm/m² day atmosphere at 0% relative humidity at 23° C. If the coating is on a known substrate, the permeability of the known substrate is subtracted out using the following equation:

Permeability of the barrier coating=$X_1/[(1/OTR)-(X_2/P_{X2})]$ where $X_1$ is barrier coating thickness; $X_2$ is substrate thickness and $P_{X2}$ is permeability of the substrate. The reduction in permeability from the unfilled polymer is calculated by dividing the permeability of the unfilled polymer by the permeability of the filled polymer. Reduction in permeability is a unitless ratio.

The dried coating preferably maintains its low permeability under strain and has a strain to first damage of at least 5% biaxial elongation at 0% RH.

EXAMPLES

The invention is illustrated by the following examples, which are not intended to limit the scope of this invention.

Experimental Procedures

Oxygen Transmission Rate Testing

Films and coated substrates are tested for oxygen transmission rate using a Mocon OXTRAN 2/20 or 2/60 module at 23° C. and 0% RH. The samples are loaded onto the modules and conditioned for 2 hours prior to testing for oxygen. Once equilibrium is reached, an OTR (oxygen transmission rate) is reported in units of cc/m² day atm.

Thickness Measurements

All thickness calculations are based on the weight of the coating, and an assumed density. The density for the polymer phase is assumed to be 0.95 gm/cc in all cases, even though it is recognized that each polymer has a different density. The density of the nanocomposite was estimated using a rule of mixtures, and an assumed density of the clay of 2 gm/cc. Correcting this for the actual density will slightly modify the permeability values, but will have little effect on the number of times reduction reported in Tables 1–3.

The thickness of the coating on a substrate is measured after the OTR is reported. Each sample is removed from the Mocon module and a circle of specified size cut from the sample. The cut circle is weighed. The weight of the coating is obtained from subtracting the weight of the uncoated circle and the thickness calculated from the size of the circle and weight of the coating. The thickness of the film is reported in millimeters and used to calculate the permeability of the film.

Permeability Calculations

Permeability is calculated using the thickness of the film and the OTR of the sample in the following equation:

Coating Permeability=(coating thickness)/[(1/$OTR$)−(substrate thickness/substrate permeability)].

The benefit of obtaining the permeability of the coating versus the OTR of the sample is that permeability reports the OTR at a specified thickness. Therefore, different coatings can be compared directly. This is important when determining the performance of a coating on varying substrates and at different thickness.

Strain Measurements

This test determines the percent strain on a sample when first visual damage occurs. Damage is defined as any visually observable change in the surface, such as cracks, crazes or other changes in texture. A 2"×2" coated substrate is mounted on a specifically designed pressure clamp in a humidity controlled chamber. The sample is strained biaxially using controlled amounts of compressed air in 1 pound increments. The sample is viewed during this test using a Leitz zoom stereomicroscope at 16× magnification and videotaped. The % strain when damage first occurs is calculated by the change in the distance of the fiducial marks on the sample. This test thus defines the strain to first damage for coatings.

Examples

Treated Filler Procedures

The MICROLITE® exfoliated silicate (W. R. Grace, 7.5%) was treated with acid or base using the following procedures:

A. 18% acid or base by weight of filler

In a 2 liter plastic jar with a lid was weighed 600 grams of MICROLITE® 963. To this dispersed silicate filler was added 8.3 grams of acid or base (100% concentrated) in 303 grams of distilled water. The resulting dispersion was mixed for a determined amount of time in the closed container at room temperature. After the determined amount of time (See example for specific time), the treated filler was used immediately.

B. 2% acid or base by weight of filler

In a 2 liter plastic jar with a lid was weighed 600 grams of MICROLITE® 963. To this dispersed silicate filler was added 0.9 grams of acid or base (100% concentrated) in 310 grams of distilled water. The resulting dispersion was mixed for a determined amount of time in the closed container at room temperature. After the determined amount of time (See example for specific time), the treated filler was used immediately.

C. 61% acid or base by weight of filler

In a 2 liter plastic jar with a lid was weighed 600 grams of MICROLITE® 963. To this dispersed silicate filler was added 27.3 grams of acid or base (100% concentrated) in 283.7 grams of distilled water. The resulting dispersion was mixed for a determined amount of time in the closed container at room temperature. After the determined amount of time (See example for specific time), the treated filler was used immediately.

D. 100% acid or base by weight of filler

In a 2 liter plastic jar with a lid was weighed 600 grams of MICROLITE® 963. To this dispersed silicate filler was added 45.5 grams of acid or base (100% concentrated) in 265.5 grams of distilled water. The resulting dispersion was mixed for a determined amount of time in the closed container at room temperature. After the determined amount of time (See example for specific time), the treated filler was used immediately.

EPDM Nanocomposites

Example 1

EPDM Unfilled

An aqueous barrier coating solution according to this invention is prepared as follows, in which the matrix is ethylene-propylene-diene copolymer (EPDM). This film does not contain filler and was made for reference.

In an 8 oz jar, 50 grams of EPDM latex (CHEM-LOK EP872, 50% solids, Lord Corporation) was stirred with 12 drops of SILWET L-77 (OSI) and 2 drops of FOAMASTER VL (Cognis). After this coating solution is applied to a polypropylene film substrate and allowed to dry, the unfilled EPDM coating is evaluated.

The oxygen transmission rate (OTR) is measured using a Mocon OX-TRAN 2/20 module. The OTR for the EPDM film on polypropylene is 1055.5 cc/M$^2$ day @ 1 atmosphere, 0% RH, 23° C. Permeability of the 77.7 micron thick EPDM film is 184.5 cc mm/m day atmosphere @ 0% RH, 23° C.

Example 2

EPDM Nanocomposite, Untreated Filler

An aqueous barrier coating solution according to this invention is prepared as follows, in which the matrix is ethylene-propylene-diene copolymer (EPDM, CHEM-LOK EP872, 50% solids, Lord Corporation) and the filler is Microlite® exfoliated silicate. The filler was untreated in this example and used as received.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.52 grams of distilled water were weighed. A stir bar was added and the solution was stirred slowly overnight. To this solution was added a mixture of 29.64 grams of EPDM latex (CHEM-LOK EP872), 2.64 grams of 2% ammonium hydroxide (Mallinckrodt), 6 drops of SILWET L77 (OSI), 2 drops of FOAMASTER VL (Cognis) and 6.17 grams of distilled water. The resulting solution was mixed thoroughly.

To the above solution, 52 grams of Microlite® 963 (7.5%, W. R. Grace) and 35 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight EPDM, 19.8% by weight filler, 0.5% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 140.8 cc/m$^2$ day @ 1 atmosphere, 0% RH, 23° C. Permeability of the 18.5 micron EPDM nanocomposite is 2.84 cc mm/m$^2$ day atmosphere @ 0% RH, 23° C. The reduction in permeability of this coating is 65 times the reduction in permeability of the unfilled EPDM latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 4%.

Example 3

EPDM Nanocomposite, 18% Acetic Acid/3 Day Filler Pre-Treatment

An aqueous barrier coating solution according to this invention is prepared as follows, in which the matrix is ethylene-propylene-diene copolymer (EPDM, CHEM-LOK EP872, 50% solids, Lord Corporation) and the filler is MICROLITE® exfoliated silicate. The filler was treated in this example with 18% acetic acid for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.52 grams of distilled water were weighed. A stir bar was added and the solution was stirred slowly overnight. To this solution was added a mixture of 29.64 grams of EPDM latex (CHEM-LOK EP872), 2.64 grams of 2% ammonium hydroxide (Mallinckrodt), 6 drops of SILWET L-77 (OSI), 2 drops of FOAMASTER VL (Cognis) and 6.17 grams of distilled water. The resulting solution was mixed thoroughly.

To the above solution, 75 grams of treated filler using 18% acetic acid by weight from procedure A, 7.8 grams of 2% ammonium hydroxide and 4.2 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight EPDM, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 505.5 cc/m² day @ 1 atmosphere, 0% RH, 23° C. Permeability of the 29.1 micron EPDM nanocomposite is 20.0 cc mm/m² day atmosphere @ 0% RH, 23° C. The reduction in permeability of this coating is 9 times the reduction in permeability of the unfilled EPDM latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 18%.

Example 4

EPDM Nanocomposite, 18% NH4OH/3 Day Filler Pre-Treatment

An aqueous barrier coating solution according to this invention is prepared as follows, in which the matrix is ethylene-propylene-diene copolymer (EPDM, CHEM-LOK EP872, 50% solids, Lord Corporation) and the filler is Microlite® exfoliated silicate. The filler was treated in this example with 18% ammonium hydroxide for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.52 grams of distilled water were weighed. A stir bar was added and the solution was stirred slowly overnight. To this solution was added a mixture of 29.64 grams of EPDM latex (CHEM-LOK EP872), 2.64 grams of 2% ammonium hydroxide (Mallinckrodt), 6 drops of SILWET L-77 (OSI), 2 drops of FOAMASTER VL (Cognis) and 6.17 grams of distilled water. The resulting solution was mixed thoroughly.

To the above solution, 75 grams of treated filler using 18% ammonium hydroxide by weight from procedure A, 5.73 grams of 2% acetic acid and 6.27 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight EPDM, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 417.2 cc/m² day @ 1 atmosphere, 0% RH, 23° C. Permeability of the 32.3 micron EPDM nanocomposite is 17.3 cc mm/m² day atmosphere @ 0% RH, 23° C. The reduction in permeability of this coating is 11 times the reduction in permeability of the unfilled EPDM latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 15%.

A summary of the data obtained in Examples 1–4 is listed in Table 1.

As can be seen, coatings of the present invention can be strained 4× the control and still maintain adequate reductions in permeability.

TABLE 1

EPDM NANOCOMPOSITES

| | Treatment[1] | Strain[4] | Permeability[2] | Reduction in Permeability[3] | Example # |
|---|---|---|---|---|---|
| Unfilled | n/a | | 184.5 | n/a | 1 |
| Untreated | n/a | 4 | 2.84 | 65 | 2 |
| Treated | 18% Acetic acid, 3 day | 18 | 20.0 | 9 | 3 |
| Treated | 18% NH₄OH, 3 day | 15 | 17.3 | 11 | 4 |

Notes:
[1]The filler treatment is detailed in the examples.
[2]Permeability is oxygen permeability and reported in units of cc mm/m² day atm @ 23° C., 0% relative humidity.
[3]Reduction in permeability is reduction of the oxygen permeability of the nanocomposite relative to the oxygen permeability of the unfilled polymer reported in times reduction.
[4]Strain is reported as the % biaxial elongation for first visual damage.

Nitrile Nanocomposites

Example 5

Nitrile Unfilled

An aqueous barrier coating solution according to this invention is prepared as follows, in which the matrix is nitrile rubber. This film does not contain filler and was made for reference.

In an 8 oz jar, 50 grams of nitrile latex (TYLAC 68073-00, 44.1% solids, Reichhold, Inc.) was stirred with 12 drops of SILWET L-77 (OSI) and 2 drops of FOAMASTER VL (Cognis). After this coating solution is applied to a polypropylene film substrate and allowed to dry, the unfilled nitrile rubber coating is evaluated.

The oxygen transmission rate (OTR) is measured using a Mocon OX-TRAN 2/20 module. The OTR for the nitrile film on polypropylene is 871.1 cc/m² day @ 1 atmosphere, 0% RH, 23° C. Permeability of the 80.2 micron thick nitrile film is 129 cc mm/m² day atmosphere @ 0% RH, 23° C.

Example 6

Nitrile Nanocomposite, 18% Acetic Acid/3 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 18% acetic acid for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.92 grams of distilled water were weighed. A stir bar was added and the solution was stirred slowly overnight. To this solution was added a mixture of 33.6 grams of nitrile latex (TYLAC 68073-00), 2.64 grams of 2% ammonium hydroxide (Mallinckrodt), 10 drops of SILWET L-77 (OSI), 2 drops of FOAMASTER VL (Cognis) and 6.31 grams of distilled water. The resulting solution was mixed thoroughly.

To the above solution, 75 grams of treated filler using 18% acetic acid by weight from procedure A, 5.73 grams of 2% ammonium hydroxide and 1.77 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight nitrile, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 216.8 cc/m day @ 1 atmosphere, 0% RH, 23° C. Permeability of the 27.7 micron nitrile nanocomposite is 6.78 cc mm/m$^2$ day atmosphere @ 0% RH, 23° C. The reduction in permeability of this coating is 19 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 34%.

Example 7

Nitrile Nanocomposite, 18% NH4OH/3 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 18% ammonium hydroxide for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.52 grams of distilled water were weighed. A stir bar was added and the solution was stirred slowly overnight. To this solution was added a mixture of 33.6 grams of nitrile latex (TYLAC 68073-00), 2.64 grams of 2% ammonium hydroxide (Mallinckrodt), 10 drops of SILWET L-77 (OSI), 2 drops of FOAMASTER VL (Cognis) and 6.31 grams of distilled water. The resulting solution was mixed thoroughly.

To the above solution, 75 grams of treated filler using 18% ammonium hydroxide by weight from procedure A, 5.73 grams of 2% acetic acid and 6.27 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight nitrile, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 187.8 cc/m$^2$ day @ 1 atmosphere, 0% RH, 23° C. Permeability of the 28.3 micron nitrile nanocomposite is 5.90 cc mm/m$^2$ day atmosphere @ 0% RH, 23° C. The reduction in permeability of this coating is 22 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 5%.

Example 8

Nitrile Nanocomposite, 18% Citric Acid/30 Minute Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 18% citric acid for 30 minutes following treated filler procedure A.

In an 8 oz jar, 1.1 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.92 grams of distilled water were weighed. A stir bar was added and the solution was stirred slowly overnight. To this solution was added a mixture of 33.6 grams of nitrile latex (TYLAC 68073-00), 2.64 grams of 2% ammonium hydroxide (Mallinckrodt), 10 drops of SILWET L-77 (OSI), 2 drops of FOAMASTER VL (Cognis) and 1.81 grams of distilled water. The resulting solution was mixed thoroughly.

To the above solution, 75 grams of treated filler using 18% citric acid by weight from procedure A, 5.73 grams of 2% ammonium hydroxide and 6.27 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight nitrile, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 208.2 cc/m$^2$ day @ 1 atmosphere, 0% RH, 23° C. Permeability of the 25.1 micron nitrile nanocomposite is 5.87 cc mm/m$^2$ day atmosphere @ 0% RH, 23° C. The reduction in permeability of this coating is 22 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 9%.

Example 9

Nitrile Nanocomposite, 2% KOH/1 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 2% potassium hydroxide for 1 day following treated filler procedure B.

In an 8 oz jar, 0.94 grams of ACUSOL® 880 (35.2%, Rohm & Haas), 1.93 grams of ACUSOL® 882 (17.1%, Rohm & Haas), 2.24 grams of 2% ammonium hydroxide (Mallinckrodt) and 20.42 grams of distilled water were weighed. A stir bar was added and the solution was stirred slowly overnight. To this solution was added a mixture of 28.43 grams of nitrile latex (TYLAC 68073-00), 2.24 grams of 2% ammonium hydroxide (Mallinckrodt), 10 drops of SILWET L-77 (OSI), 2 drops of FOAMASTER VL (Cognis) and 6.80 grams of distilled water. The resulting solution was mixed thoroughly.

To the above solution, 63.46 grams of treated filler using 2% potassium hydroxide by weight from procedure B, 4.85 grams of 2% acetic acid and 18.69 grams of distilled water were added. The resulting solution was stirred with a stir bar. The resulting dispersion at room temperature is ready for application, e.g., spray-coating, onto a plastic or rubber substrate. The coating mixture has 11.1% solids in water content.

After this coating solution is applied to a polypropylene film substrate and allowed to dry, the coating contains 75.2% by weight nitrile, 19.8% by weight filler, 0.9% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 222.8 cc/m$^2$ day @ 1 atmosphere, 0% RH, 23° C. Permeability of the 21.4 micron nitrile nanocomposite is 5.4 cc mm/m$^2$ day atmosphere @ 0% RH, 23° C. The reduction in permeability of this coating is 24 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 9%.

Example 10

Nitrile Nanocomposite, 2% KOH/2 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 2% potassium hydroxide for 2 days following treated filler procedure B.

In an 8 oz jar, 0.94 grams of ACUSOL® 880 (35.2%, Rohm & Haas), 1.93 grams of ACUSOL® 882 (17.1%, Rohm & Haas), 2.24 grams of 2% ammonium hydroxide (Mallinckrodt) and 20.42 grams of distilled water were weighed. A stir bar was added and the solution was stirred slowly overnight. To this solution was added a mixture of 28.43 grams of nitrile latex (TYLAC 68073-00), 2.24 grams of 2% ammonium hydroxide (Mallinckrodt), 10 drops of SILWET L-77 (OSI), 2 drops of FOAMASTER VL (Cognis) and 6.80 grams of distilled water. The resulting solution was mixed thoroughly.

To the above solution, 63.46 grams of treated filler using 2% potassium hydroxide by weight from procedure B, 4.85 grams of 2% acetic acid and 18.69 grams of distilled water were added. The resulting solution was stirred with a stir bar. The resulting dispersion at room temperature is ready for application, e.g., spray-coating, onto a plastic or rubber substrate. The coating mixture has 11.1% solids in water content.

After this coating solution is applied to a polypropylene film substrate and allowed to dry, the coating contains 75.2% by weight nitrile, 19.8% by weight filler, 0.9% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 253.8 cc/m$^2$ day @ 1 atmosphere, 0% RH, 23° C. Permeability of the 17.1 micron nitrile nanocomposite is 5.01 cc mm/m$^2$ day atmosphere @ 0% RH, 23° C. The reduction in permeability of this coating is 26 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 12%.

Example 11

Nitrile Nanocomposite, 2% KOH/3 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 2% potassium hydroxide for 3 days following treated filler procedure B.

In an 8 oz jar, 0.94 grams of ACUSOL® 880 (35.2%, Rohm & Haas), 1.93 grams of ACUSOL® 882 (17.1%, Rohm & Haas), 2.24 grams of 2% ammonium hydroxide (Mallinckrodt) and 20.42 grams of distilled water were weighed. A stir bar was added and the solution was stirred slowly overnight. To this solution was added a mixture of 28.43 grams of nitrile latex (TYLAC 68073-00), 2.24 grams of 2% ammonium hydroxide (Mallinckrodt), 10 drops of SILWET L-77 (OSI), 2 drops of FOAMASTER VL (Cognis) and 6.80 grams of distilled water. The resulting solution was mixed thoroughly.

To the above solution, 63.46 grams of treated filler using 2% potassium hydroxide by weight from procedure B, 4.85 grams of 2% acetic acid and 18.69 grams of distilled water were added. The resulting solution was stirred with a stir bar. The resulting dispersion at room temperature is ready for application, e.g., spray-coating, onto a plastic or rubber substrate. The coating mixture has 11.1% solids in water content.

After this coating solution is applied to a polypropylene film substrate and allowed to dry, the coating contains 75.2% by weight nitrile, 19.8% by weight filler, 0.9% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 260.7 $cc/m^2$ day @ 1 atmosphere, 0% RH, 23° C. Permeability of the 16.4 micron nitrile nanocomposite is 4.99 cc $mm/m^2$ day atmosphere @ 0% RH, 23° C. The reduction in permeability of this coating is 26 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 13%.

Example 12

Nitrile Nanocomposite, 18% Glycine/4 Day Filler Pre-Treatment

An aqueous barrier coating solution according to this invention is prepared as follows, in which the matrix is nitrile rubber (TYLAC 68073-00, 44.1% solids, Reichhold, Inc) and the filler is MICROLITE® exfoliated silicate. The filler was treated in this example with 18% glycine for 4 days following treated filler procedure A.

In an 8 oz jar, 1.11 grams of ACUSOL® 880 (35.2%, Rohm & Haas), 2.28 grams of ACUSOL® 882 (17.1%, Rohm & Haas), 2.64 grams of 2% ammonium hydroxide (Mallinckrodt) and 18.92 grams of distilled water were weighed. A stir bar was added and the solution was stirred slowly overnight. To this solution was added a mixture of 33.6 grams of nitrile latex (TYLAC 68073-00), 2.64 grams of 2% ammonium hydroxide (Mallinckrodt), 10 drops of SILWET L-77 (OSI), 2 drops of FOAMASTER VL (Cognis) and 1.81 grams of distilled water. The resulting solution was mixed thoroughly.

To the above solution, 75 grams of treated filler using 18% glycine by weight from procedure A, 5.73 grams of 2% ammonium hydroxide and 6.27 grams of distilled water were added. The resulting solution was stirred with a stir bar. The resulting dispersion at room temperature is ready for application, e.g., spray-coating, onto a plastic or rubber substrate. The coating mixture has 13.1% solids in water content.

After this coating solution is applied to a polypropylene film substrate and allowed to dry, the coating contains 75.3% by weight nitrile, 19.8% by weight filler, 0.8% SILWET L-77 wetting agent, 2.0% by weight ACUSOL 880, 2.0% by weight ACUSOL 882 and 0.1% by weight FOAMASTER VL anti-foaming agent.

The oxygen transmission rate (OTR) is measured using a Mocon OX-TRAN 2/20 module. The OTR is 198.6 $cc/m^2$ day @ 1 atmosphere, 0% RH, 23° C. Permeability of the 20.3 micron nitrile nanocomposite is 4.50 cc $mm/m^2$ day atmosphere @ 0% RH, 23° C. The reduction in permeability of this coating is 29 times the reduction in permeability of the unfilled nitrile latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 8%.

A summary of the data obtained in Examples 5–11 is listed in Table 2.

Once again, strain levels up to 34% can be tolerated while still maintaining permeability reductions ranging from 19 to 29 times reduction relative to the unfilled polymer.

TABLE 2

NITRILE NANOCOMPOSITES

| | Treatment[1] | Strain[4] | Permeability[2] | Reduction in Permeability[3] | Example # |
|---|---|---|---|---|---|
| Unfilled | n/a | | 129 | n/a | 5 |
| Treated | 18% Acetic acid, 3 day | 34 | 6.78 | 19 | 6 |
| Treated | 18% NH₄OH, 3 day | 5 | 5.90 | 22 | 7 |
| Treated | 18% Citric acid, 30 min | 9 | 5.87 | 22 | 8 |
| Treated | 2% KOH, 1 day | 9 | 5.44 | 24 | 9 |
| Treated | 2% KOH, 2 days | 12 | 5.01 | 26 | 10 |
| Treated | 2% KOH, 3 days | 13 | 4.99 | 26 | 11 |
| Treated | 18% glycine, 4 days | 8 | 4.50 | 29 | 12 |

Notes:
[1]The filler treatment is detailed in the examples.
[2]Permeability is oxygen permeability and reported in units of cc $mm/m^2$ day atm @ 23° C., 0% relative humidity.
[3]Reduction in permeability is reduction of the oxygen permeability of the nanocomposite relative to the oxygen permeability of the unfilled polymer reported in times reduction.
[4]Strain is reported as the % biaxial elongation for first visual damage.

Neoprene Nanocomposites

Example 13

Neoprene Unfilled

An aqueous barrier coating solution according to this invention is prepared as follows, in which the matrix is Neoprene rubber. This film does not contain filler and was made for reference.

In an 8 oz jar, 38.34 grams of Neoprene 571 latex (48.9% solids, DuPont Dow Elastomers, LLC), 98.17 grams of Neoprene 671 (57.3% solids, DuPont Dow Elastomers, LLC) was stirred with 120 drops of SILWET L-77 (OSI), 4 drops of FOAMASTER VL (Cognis), 1.0 grams of ZONYL 8952 (50%, DuPont Performance Chemicals and Intermediates) and 13.49 grams distilled water. After this coating solution is applied to a polypropylene film substrate and allowed to dry, the unfilled Neoprene rubber coating is evaluated.

The oxygen transmission rate (OTR) is measured using a Mocon OX-TRAN 2/20 module. The OTR for the Neoprene film on polypropylene is 812.3 $cc/m^2$ day @ 1 atmosphere, 0% RH, 23° C. Permeability of the 88.1 micron thick Neoprene film is 125 cc mm/m² day atmosphere @ 0% RH, 23° C.

Example 14

Neoprene Nanocomposite, Untreated Filler

An aqueous barrier coating solution according to this invention is prepared as follows, in which the matrix is Neoprene rubber and the filler is MICROLITE® exfoliated silicate. The filler was untreated in this example and used as received.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 25 drops of SILWET L77 (OSI), 2 drops of FOAMASTER VL (Cognis) and 8.38 grams of distilled water. The resulting solution was mixed thoroughly.

To the above solution, 49.5 grams of MICROLITE® 963 (7.5%, W. R. Grace) and 54.3 grams of distilled water were added. The resulting solution was stirred with a stir bar. The resulting dispersion at room temperature is ready for application, e.g., spray-coating, onto a plastic or rubber substrate. The coating mixture has 8.45% solids in water content.

After this coating solution is applied to a polypropylene film substrate and allowed to dry, the coating contains 62.5% by weight Neoprene, 29.2% by weight filler, 2.4% SILWET L-77 wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 55.0 cc/m² day @ 1 atmosphere, 0% RH, 23° C. Permeability of the 10.3 micron Neoprene nanocomposite is 0.6 cc mm/m² day atmosphere @ 0% RH, 23° C. The reduction in permeability of this coating is 208 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 3%.

Example 15

Neoprene Nanocomposite, 18% Acetic Acid/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 18% acetic acid for 3 days following treated filler procedure A.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 25 drops of SILWET L77 (OSI), 2 drops of FOAMASTER VL (Cognis) and 8.38 grams of distilled water. The resulting solution was mixed thoroughly.

To the above solution, 71.39 grams of treated filler using 18% acetic acid by weight from procedure A, 0.74 grams of 29% sodium hydroxide (Fisher Scientific), 2.21 grams of 29% potassium hydroxide (Fisher Scientific) and 29.48 grams of distilled water were added. The resulting solution was stirred with a stir bar. The resulting dispersion at room temperature is ready for application, e.g., spray-coating, onto a plastic or rubber substrate. The coating mixture has 8.45% solids in water content.

After this coating solution is applied to a polypropylene film substrate and allowed to dry, the coating contains 62.5% by weight Neoprene, 29.2% by weight filler, 2.4% SILWET L-77 wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 135.9 cc/m² day @ 1 atmosphere, 0% RH, 23° C. Permeability of the 26.4 micron Neoprene nanocomposite is 3.9 cc mm/m² day atmosphere @ 0% RH, 23° C. The reduction in permeability of this coating is 32 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 25%.

Example 16

Neoprene Nanocomposite, 18% NH4OH/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 18% ammonium hydroxide for 3 days following treated filler procedure A.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 25 drops of SILWET L77 (OSI), 2 drops of FOAMASTER VL (Cognis) and 8.38 grams of distilled water. The resulting solution was mixed thoroughly.

To the above solution, 71.39 grams of treated filler using 18% ammonium hydroxide by weight from procedure A and 32.43 grams of distilled water were added. The resulting solution was stirred with a stir bar. The resulting dispersion at room temperature is ready for application, e.g., spray-coating, onto a plastic or rubber substrate. The coating mixture has 8.45% solids in water content.

After this coating solution is applied to a polypropylene film substrate and allowed to dry, the coating contains 62.5% by weight Neoprene, 29.2% by weight filler, 2.4% SILWET L-77 wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 110.9 cc/m$^2$ day @ 1 atmosphere, 0% RH, 23° C. Permeability of the 21.7 micron Neoprene nanocomposite is 2.5 cc mm/m$^2$ day atmosphere @ 0% RH, 23° C. The reduction in permeability of this coating is 50 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 5%.

Example 17

Neoprene Nanocomposite, 61% NH4OH/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 61% ammonium hydroxide for 3 days following treated filler procedure C.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 0.6 grams of ZONYL FSP (35%, DuPont Performance Chemicals and Intermediates), 2 drops of FOAMASTER VL (Cognis) and 8.38 grams of distilled water. The resulting solution was mixed thoroughly.

To the above solution, 71.39 grams of treated filler using 18% ammonium hydroxide by weight from procedure A and 32.43 grams of distilled water were added. The resulting solution was stirred with a stir bar. The resulting dispersion at room temperature is ready for application, e.g., spray-coating, onto a plastic or rubber substrate. The coating mixture has 8.4% solids in water content.

After this coating solution is applied to a polypropylene film substrate and allowed to dry, the coating contains 62.9% by weight Neoprene, 29.4% by weight filler, 1.7% ZONYL FSP wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 122.7 cc/m$^2$ day @ 1 atmosphere, 0% RH, 23° C. Permeability of the 18.3 micron Neoprene nanocomposite is 2.4 cc mm/m$^2$ day atmosphere @ 0% RH, 23° C. The reduction in permeability of this coating is 52 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 9%.

Example 18

Neoprene Nanocomposite, 2% NaOH/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 2% sodium hydroxide for 3 days following treated filler procedure B.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 25 drops of SILWET L77 (OSI), 2 drops of FOAMASTER VL (Cognis) and 8.38 grams of distilled water. The resulting solution was mixed thoroughly.

To the above solution, 71.39 grams of treated filler using 2% sodium hydroxide by weight from procedure B, 2.95 grams of 29% ammonium hydroxide (Mallinckrodt) and 29.48 grams of distilled water were added. The resulting solution was stirred with a stir bar. The resulting dispersion at room temperature is ready for application, e.g., spray-coating, onto a plastic or rubber substrate. The coating mixture has 8.45% solids in water content.

After this coating solution is applied to a polypropylene film substrate and allowed to dry, the coating contains 62.5% by weight Neoprene, 29.2% by weight filler, 2.4% SILWET L-77 wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 149.1 cc/m$^2$ day @ 1 atmosphere, 0% RH, 23° C. Permeability of the 8.5 micron Neoprene nanocomposite is 1.4 cc mm/m$^2$ day atmosphere @ 0% RH, 23° C. The reduction in permeability of this coating is 89 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 5%.

Example 19

Neoprene Nanocomposite, 2% KOH/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 2% potassium hydroxide for 3 days following treated filler procedure B.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 25 drops of SILWET L77 (OSI), 2 drops of FOAMASTER VL (Cognis) and 8.38 grams of distilled water. The resulting solution was mixed thoroughly.

To the above solution, 71.39 grams of treated filler using 2% potassium hydroxide by weight from procedure B, 2.95 grams of 29% ammonium hydroxide (Mallinckrodt) and 29.48 grams of distilled water were added. The resulting solution was stirred with a stir bar. The resulting dispersion at room temperature is ready for application, e.g., spray-coating, onto a plastic or rubber substrate. The coating mixture has 8.45% solids in water content.

After this coating solution is applied to a polypropylene film substrate and allowed to dry, the coating contains 62.5% by weight Neoprene, 29.2% by weight filler, 2.4% SILWET L-77 wetting agent, 2.9% by weight ACUSOL 880, 2.9% by weight ACUSOL 882 and 0.1% by weight FOAMASTER VL anti-foaming agent.

The oxygen transmission rate (OTR) is measured using a Mocon OX-TRAN 2/20 module. The OTR is 311.4 cc/m$^2$ day @ 1 atmosphere, 0% RH, 23° C. Permeability of the 7.4 micron Neoprene nanocomposite is 2.8 cc mm/m$^2$ day atmosphere @ 0% RH, 23° C. The reduction in permeability of this coating is 45 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 10%.

Example 20

Neoprene Nanocomposite, 18% Acetic Acid/3 Day Filler Pre-Treatment

An aqueous barrier coating solution according to this invention is prepared as follows, in which the matrix is Neoprene rubber (DuPont Dow Elastomers, LLC) with curatives and the filler is MICROLITE® exfoliated silicate. The filler was treated in this example with 18% acetic acid for 3 days following treated filler procedure A.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 3.64 grams of Neoprene 571 latex (48.9% solids, DuPont Dow Elastomers, LLC), 9.32 grams of Neoprene 671 latex (57.3% solids, DuPont Dow Elastomers, LLC), 1.52 grams of Ti-Rite IM400 (52.1%, Technical Industries, Inc.) 25 drops of SILWET L77 (OSI), 2 drops of FOAMASTER VL (Cognis) and 8.38 grams of distilled water. The resulting solution was mixed thoroughly.

To the above solution, 71.39 grams of treated filler using 18% acetic acid by weight from procedure A, 0.74 grams of 29% sodium hydroxide (Fisher Scientific), 2.21 grams of 29% potassium hydroxide (Fisher Scientific) and 29.48 grams of distilled water were added. The resulting solution was stirred with a stir bar. The resulting dispersion at room temperature is ready for application, e.g., spray-coating, onto a plastic or rubber substrate. The coating mixture has 8.44% solids in water content.

After this coating solution is applied to a polypropylene film substrate and allowed to dry, the coating contains 56.2% by weight Neoprene, 29.3% by weight filler, 2.4% SILWET L-77 wetting agent, 2.9% by weight ACUSOL 880, 2.9% by weight ACUSOL 882, 6.2% Ti-Rite IMN400 curatives and 0.1% by weight FOAMASTER VL anti-foaming agent.

The oxygen transmission rate (OTR) is measured using a Mocon OX-TRAN 2/20 module. The OTR is 174.9 cc/m day @ 1 atmosphere, 0% RH, 23° C. Permeability of the 16.8 micron Neoprene nanocomposite is 3.2 cc mm/m$^2$ day atmosphere @ 0% RH, 23° C. The reduction in permeability of this coating is 39 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 12%.

Example 21

Neoprene Nanocomposite, 100% NH4OH/3 Day Filler Pre-Treatment

An aqueous barrier coating solution according to this invention is prepared as follows, in which the matrix is Neoprene rubber (DuPont Dow Elastomers, LLC) and the filler is MICROLITE® exfoliated silicate. The filler was treated in this example with 100% ammonium hydroxide for 3 days following treated filler procedure D.

In an 8 oz jar, 1.05 grams of ACUSOL® 880 (35.2%, Rohm & Haas), 2.17 grams of ACUSOL® 882 (17.1%, Rohm & Haas) and 20.16 grams of distilled water were weighed. A stir bar was added and the solution was stirred slowly overnight. To this solution was added a mixture of 4.05 grams of Neoprene 571 latex (48.9% solids, DuPont Dow Elastomers, LLC), 10.37 grams of Neoprene 671 latex (57.3% solids, DuPont Dow Elastomers, LLC), 0.4 grams of ZONYL FSP (35%, DuPont Performance Chemicals and Intermediates), 0.27 grams of ZONYL 8952 (50%, DuPont Performance Chemicals and Intermediates), 4 drops of FOAMASTER VL (Cognis) and 6.72 grams of distilled water. The resulting solution was mixed thoroughly.

To the above solution, 71.39 grams of treated filler using 100% ammonium hydroxide by weight from procedure D and 32.43 grams of distilled water were added. The resulting solution was stirred with a stir bar. The resulting dispersion at room temperature is ready for application, e.g., spray-coating, onto a plastic or rubber substrate. The coating mixture has 8.34% solids in water content.

After this coating solution is applied to a polypropylene film substrate and allowed to dry, the coating contains 62.6% by weight Neoprene, 29.3% by weight filler, 1.1% ZONYL FSP wetting agent, 1.0% ZONYL 8952 wetting agent, 2.9% by weight ACUSOL 880, 2.9% by weight ACUSOL 882 and 0.2% by weight FOAMASTER VL anti-foaming agent.

The oxygen transmission rate (OTR) is measured using a Mocon OX-TRAN 2/20 module. The OTR is 203.7 cc/m$^2$ day @ 1 atmosphere, 0% RH, 23° C. Permeability of the 14.9 micron Neoprene nanocomposite is 3.4 cc mm/m$^2$ day atmosphere @ 0% RH, 23° C. The reduction in permeability of this coating is 37 times the reduction in permeability of the unfilled Neoprene latex.

The coating solution was also applied to ethylene-propylene-diene copolymer substrate (McMaster-Carr, 0.8 mm). The film was allowed to dry and contains the same composition as the polypropylene coating. A strain evaluation was done as described in the test measurement section and the "strain to first damage" reported at 23° C. and 0% relative humidity as 14%.

A summary of the data obtained in Examples 13–21 is listed in Table 3.

In these examples, the control could only be stretched to 3% before visual damage is seen. The coatings of this invention can be strained from about 5 to as high as 25% while retaining reductions in permeability ranging from 32 to about 89 times reduction relative to the unfilled polymer.

TABLE 3

NEOPRENE NANOCOMPOSITES

| Treatment[1] | Strain[4] | Permeability[2] | Reduction in Permeability[3] | Example # |
|---|---|---|---|---|
| Unfilled | n/a | 125 | n/a | 13 |
| Untreated | n/a | 3 | 0.6 | 208 | 14 |
| Treated | 18% acetic acid, 3 days | 25 | 3.9 | 32 | 15 |
| Treated | 18% NH$_4$OH, 3 days | 5 | 2.5 | 50 | 16 |
| Treated | 61% NH$_4$OH, 3 days | 9 | 2.4 | 52 | 17 |
| Treated | 2% NaOH, 3 days | 5 | 1.4 | 89 | 18 |
| Treated | 2% KOH, 3 days | 10 | 2.8 | 45 | 19 |
| Treated | 18% acetic acid, 3 days # | 12 | 3.2 | 39 | 20 |
| Treated | 100% NH$_4$OH, 3 days | 14 | 3.4 | 37 | 21 |

Notes:
[1] The filler treatment is detailed in the examples.
[2] Permeability is oxygen permeability and reported in units of cc mm/m$^2$ day atm @ 23° C., 0% relative humidity.
[3] Reduction in permeability is reduction of the oxygen permeability of the nanocomposite relative to the oxygen permeability of the unfilled polymer reported in times reduction.
[4] Strain is reported as the % biaxial elongation for first visual damage.
Contains curatives.

ALTERNATIVE EMBODIMENTS

There is provided in a first alternative embodiment (Alternative Embodiment No. 1) a coating dispersion containing a non-butyl elastomeric polymer, a dispersed, substantially exfoliated silicate filler material not functionalized with organic cations, the silicate having an aspect ratio greater than 25 and the silicate is present at less than 60% of the total solids content; and at least one additive, selected from the group consisting of surfactants, emulsifiers, anti-foaming agents, dispersing agents, wetting agents, leveling agents and thickeners wherein the total solids content is less than 30% of the dispersion, the dispersion provides a coating with an at least 5-fold greater reduction in permeability than a coating formed of the unfilled non-butyl elastomeric polymer alone and wherein the coating retains its permeability properties under strain and has a strain to first damage of at least 5% biaxial elongation at 0% RH.

The coating suspension can be a dispersion, an emulsion, a suspension and a latex.

The coating suspension contains a non-butyl elastomeric polymer, selected from Neoprene, nitrile rubbers, and EPDM. These polymers can be cured, un-cured and partially cured and can be present in the dispersion at between about 40% to about 95% by weight.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates. The preferred silicate filler is vermiculite and is present in the suspension at less than 60% solids, preferably from about 5 to about 50% of the total solids.

The silicate filler can be treated with acid or base prior to mixing with the non-butyl elastomeric polymer. The acid is chosen from acetic acid, glycine and citric acid and the base is chosen from ammonium hydroxide, sodium hydroxide and potassium hydroxide.

The total solids content of the coating suspension is about 1 to about 30%, preferably about 5 to about 25%.

The coating suspension can further comprise a component selected from the group consisting of water, hexane, heptane, toluene, isopropyl alcohol, cyclohexanone, ethanol, methanol, other hydrocarbons, and combinations thereof.

Alternative Embodiment No. 2 is a method of producing a coating dispersion comprising mixing an aqueous dispersion of a non-butyl elastomeric polymer, an acid or base treated dispersed, substantially exfoliated silicate filler material not functionalized with organic cations, the silicate having an aspect ratio greater than 25 and the silicate is present at less than 60% of the total solids content and at least one additive, selected from the group consisting of surfactants, emulsifiers, anti-foaming agents, dispersing agents, wetting agents, leveling agents and thickeners, wherein the total solids content is less than 30% of the dispersion and wherein the dispersion provides a coating with an at least 5-fold greater reduction in permeability than a coating formed of the unfilled non-butyl elastomeric polymer alone and wherein the coating retains its permeability properties under strain and has a strain to first damage of at least 5% biaxial elongation at 0% RH.

The coating suspension can be a dispersion, an emulsion, a suspension and a latex.

The coating suspension contains a non-butyl elastomeric polymer, selected from Neoprene, nitrile rubbers, and EPDM. These polymers can be cured, un-cured and partially cured and can be present in the dispersion at between about 40% to about 95% by weight.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates. The preferred silicate filler is vermiculite and is present in the suspension at less than 60% solids, preferably from about 5 to about 50% of the total solids.

The silicate filler can be treated with acid or base prior to mixing with the non-butyl elastomeric polymer. The acid is chosen from acetic acid, glycine and citric acid and the base is chosen from ammonium hydroxide, sodium hydroxide and potassium hydroxide.

The total solids content of the coating suspension is about 1 to about 30%, preferably about 5 to about 25%.

The coating suspension can further comprise a component selected from the group consisting of water, hexane, heptane, toluene, isopropyl alcohol, cyclohexanone, ethanol, methanol, other hydrocarbons, and combinations thereof.

Alternative Embodiment No. 3 is a coated article, which has on at least one surface or interface thereof, a dried barrier coating produced from application of the barrier coating mixture as described above. The coating on the article reduces the gas permeation rate of said article by having a permeability that is at least 5-fold greater reduction in permeability than a coating formed of the unfilled non-butyl elastomeric polymer alone.

Alternative Embodiment No. 4 is a barrier coating comprising about 50% to about 90% by weight of a non-butyl elastomeric polymer, between about 10% to about 50% by weight of an acid or base treated dispersed exfoliated layered platelet silicate filler having an aspect ratio greater than 25; and between about 0.1% to about 15% by weight of at least one additive, the silicate in the dried coating or film having an aspect ratio greater than 25, wherein the dried coating reduces the gas permeability of the coated article greater than 5-fold the permeability of the substrate coated with the polymer alone.

While the invention has been described in connection with several embodiments, modifications of those embodiments within the spirit and scope of the present invention will be readily apparent to those of skill in the art. The invention is defined in the appended claims.

What is claimed is:

1. A barrier coating derived from an aqueous dispersion of a non-butyl elastomeric polymer, a substantially exfoliated acid or base modified or treated silicate filler material not functionalized with organic cations, the silicate having an aspect ratio greater than 25, wherein % of the silicate is less than 60% of the total solid content, and at least one additive, selected from the group consisting of surfactants, emulsifiers, anti-foaming agents, dispersing agents, wetting agents, leveling agents and thickeners wherein the coating exhibits an at least 5-fold reduction in gas permeability than a coating formed of said non-butyl elastomeric polymer alone and said coating retains its barrier properties under strain and the acid or base modified or treated silicate filler is effective to increase the strain resistance of the coating as compared with a like coating with unmodified or untreated filler such that the coating has a strain to first damage of at least 5% biaxial elongation at 0% RH.

2. The barrier coating according to claim 1 wherein said coating retains its barrier properties under strain and has a strain to first damage of at least 10% biaxial elongation at 0% RH.

3. The barrier coating according to claim 2 wherein said coating retains its barrier properties under strain and has a strain to first damage of at least 25% biaxial elongation at 0% RH.

4. The barrier coating according to claim 3 wherein said coating retains its barrier properties under strain and has a strain to first damage of at least 40% biaxial elongation at 0% RH.

5. The barrier coating according to claim 1 wherein said coating exhibits an at least 25-fold reduction in gas permeability as compared with a coating formed of said non-butyl elastomeric polymer alone.

6. The barrier coating according to claim 1 wherein said coating exhibits an at least 50-fold reduction in gas permeability as compared with a coating formed of said non-butyl elastomeric polymer alone.

7. The barrier coating according to claim 6 wherein said coating exhibits an at least 100-fold reduction in gas permeability as compared with a coating formed of said non-butyl elastomeric polymer alone.

8. The barrier coating according to claim 7 wherein said coating exhibits an at least 200-fold reduction in gas permeability as compared with a coating formed of said non-butyl elastomeric polymer alone.

9. The barrier coating according to claim 1 wherein said dispersion is in a form selected from the group consisting of a dispersion, an emulsion, a suspension and a latex.

10. The barrier coating according to claim 1 wherein said non-butyl elastomeric polymer is selected from the group consisting of neoprene, nitrile rubbers, and EPDM.

11. The barrier coating according to claim 10 wherein said non-butyl elastomeric polymer can be cured, un-cured and partially cured.

12. The barrier coating according to claim 1 wherein said acid or base modified or treated silicate filler is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates.

13. The barrier coating according to claim 12 wherein said acid or base modified or treated silicate filler is vermiculite.

14. The barrier coating according to claim 12 wherein said acid or base modified or treated silicate filler is treated with acid or base prior to mixing with said non-butyl elastomeric polymer.

15. The barrier coating according to claim 1, wherein the modified or treated silicate filler is treated with an acid chosen from acetic acid, glycine and citric acid.

16. The barrier coating according to claim 1, wherein the modified or treated silicate filler is treated with a base chosen from ammonium hydroxide, sodium hydroxide and potassium hydroxide.

17. The barrier coating according to claim 1 wherein said acid or base modified or treated silicate is present in said dispersion at between 5 to about 50% by weight of the total solids content.

18. The barrier coating according to claim 1 wherein said dispersion has a total solids content of from about 5 to about 25%.

19. The barrier coating according to claim 1, wherein said coating exhibits an at least 2-fold increase in strain to first damage as compared to a like coating formed with unmodified or untreated silicate.

20. The barrier coating according to claim 1, wherein said coating exhibits more than a 6-fold increase in strain to first damage as compared to a like coating formed with unmodified or untreated silicate.

21. A method of producing a barrier coating film comprising:
  a) modifying substantially exfoliated silicate filler material not functionalized with organic cations with an acid or base to form acid or base modified or treated silicate filler with an aspect ratio greater than about 25:
  b) applying to a substrate an aqueous dispersion containing a non-butyl elastomeric polymer, at least one additive, selected from the group consisting of surfactants, emulsifiers, anti-foaming agents, dispersing agents, wetting agents, leveling agents and thickeners, and the modified or treated filler, wherein % of the modified or treated filler in the aqueous dispersion is from about 5% to about 60% of the solid content; and
  c) drying the dispersion to a barrier coating having the same polymer to filler ratio as in said dispersion wherein the coating exhibits an at least 5-fold reduction in gas permeability than a coating formed of said non-butyl elastomeric polymer alone and said coating retains its barrier properties under strain and the acid or base modified or treated silicate filler is effective to increase the strain resistance of the coating as compared with a like coating with unmodified filler such that the coating has a strain to first damage of at least 5% biaxial elongation at 0% RH.

22. The method according to claim 21 wherein said dispersion is in a form selected from the group consisting of a dispersion, an emulsion, a suspension and a latex.

23. The method according to claim 21 wherein said non-butyl elastomeric polymer is selected from the group consisting of Neoprene, nitrile rubbers, and EPDM.

24. The method according to claim 23 wherein said non-butyl elastomeric polymer can be cured, un-cured and partially cured.

25. The method according to claim 21 wherein said silicate is selected from the group consisting of bentonite, vermiculite, montmorillonite, nontronite, beidellite, volkonskoite, hectorite, saponite, laponite, sauconite, magadiite, kenyaite, ledikite and mixtures and dispersions of the above silicates.

26. The method according to claim 25 wherein said silicate is vermiculite.

27. The method according to claim 21, wherein the silicate is mixed with an acid chosen from acetic acid, glycine and citric acid.

28. The method according to claim 21, wherein the silicate is mixed with a base said base is selected from ammonium hydroxide, sodium hydroxide and potassium hydroxide.

29. The method according to claim 21 wherein said modified or treated filler is present in said dispersion at between about 5 to about 50% by weight of the total solids content.

30. The method according to claim 21 wherein said dispersion has a total solids content of from about 5 to about 25%.

31. The method according to claim 21, wherein said substrate is selected from the group consisting of films, membranes, gloves, tennis balls, basketballs, soccer balls, footballs, volley balls, racket balls, handballs, beach balls and toy balls and inflated products such as automobile and truck tires, bicycle tires, boats, air mattresses and inflatable beds.

32. The method according to claim 21, wherein the acid or base is mixed with the silicate filler at a ratio of from about 1:1 to about 1:50 of acid or base to silicate filler on a dry weight basis.

33. The method according to claim 21, wherein the silicate filler is acid or base treated for at least about 30 minutes.

34. The method according to claim 21, wherein the silicate filler is acid or base treated for at least about 1 day.

35. The method according to claim 21, wherein the silicate filler is acid or base treated for at least about 2 days.

36. The method according to claim 21, wherein the silicate filler is acid or base treated for at least about 3 days.

* * * * *

UNITED STATES PATENT AND TRADEMARK OFFICE
CERTIFICATE OF CORRECTION

| | | |
|---|---|---|
| PATENT NO. | : 7,078,453 B1 | Page 1 of 1 |
| APPLICATION NO. | : 10/741251 | |
| DATED | : July 18, 2006 | |
| INVENTOR(S) | : Carrie A. Feeney et al. | |

It is certified that error appears in the above-identified patent and that said Letters Patent is hereby corrected as shown below:

Col. 1, line 11, insert new paragraph (immediately following the claim for priority):

--This invention was made under support from a contract with an agency of the United States. The name of the U.S. Government agency and the Government contract number are: Department of Defense, US Army, Robert Morris Acquisition Center, Natick Contracting Division, Contract No. DAAD16-03-C-0041. The Government has certain rights in this invention.--

Signed and Sealed this

Fourth Day of September, 2007

JON W. DUDAS
*Director of the United States Patent and Trademark Office*